United States Patent [19]

Natale

[11] 4,102,354
[45] Jul. 25, 1978

[54] SELF-REGULATING FLUID PRESSURE AND TEMPERATURE VALVE AND ASSEMBLY

[76] Inventor: Michele Natale, 9812 Amanita Ave., Tujunga, Calif. 91042

[21] Appl. No.: 726,608

[22] Filed: Sep. 27, 1976

[51] Int. Cl.² .......................................... G05D 11/03
[52] U.S. Cl. ............................................. 137/98
[58] Field of Search ................................. 137/98, 100

[56] References Cited

U.S. PATENT DOCUMENTS

| 962,111 | 6/1910 | Assmann | 137/98 UX |
|---|---|---|---|
| 1,989,248 | 1/1935 | Scott | 137/100 X |
| 2,581,855 | 1/1952 | Griffith | 137/98 |
| 3,508,567 | 4/1970 | Kirk et al. | 137/98 |

*Primary Examiner*—Robert G. Nilson
*Attorney, Agent, or Firm*—John J. Posta, Jr.

[57] ABSTRACT

The improved assembly of the invention includes a novel valve which comprises a housing having a first channel, specifically a single fluid-receiving channel, extending therethrough and a second channel, specifically a valve body-receiving channel, intersecting the first channel to obstruct it or not, depending on the position of a floating, specially contoured valve body in the second channel. The valve body is automatically variably positioned in the second channel in response to relative pressures exerted on its opposite ends. One of its ends is exposed to fluid pressure, such as from a cold water line connected to the first channel, such pressure being passed to such end from the first channel via a small side passageway. The opposite end of the valve body is exposed to fluid pressure passed to it from a remote source, such as a hot water line, as by a pressure conduit. The hot water line does not directly connect with nor cause hot water to pass near or through the housing. Accordingly, automatic regulation of the flow of cold water or other fluid through the housing can be regulated without heat exchange or mixing with fluid from the remote source, such as the hot water line. The valve body includes a reduced portion, which may have an oval transverse cross section with its wider portion toward the top, and main body and tail portions of larger dimensions. The shape of the valve body and the passageways extending therethrough facilitate it to freely float in the proper orientation within the second channel.

24 Claims, 9 Drawing Figures

SELF-REGULATING FLUID PRESSURE AND TEMPERATURE VALVE AND ASSEMBLY

BACKGROUND OF THE INVENTION

1. Field of the Invention

The present invention generally relates to fluid regulating means and more particularly to pressure responsive fluid regulating valves and assemblies.

2. Prior Art

Various types of valves and assemblies are currently used to regulate and balance the flow of fluids in response to changes in pressure and/or temperature. Such valves and assemblies are common in hot and cold water regulating systems, for example, in shower stall assemblies, lavatory basins, etc. However, most such assemblies are very complicated and expensive and/or readily wear or corrode because of a number of moving parts. Moreover, they are wasteful in that both the hot and cold water lines run through their metallic valve housing so that in some instances the hot and cold water become undesirably mixed, even when the system is not activated, and in most instances suffer substantial indirect, if not direct, heat exchange and thus heat loss by dilution and dissipation. In view of the high cost of energy and the shortage thereof, it would be desirable if an improved, inexpensive, durable automatic self-regulating valve and valve assembly could be provided which could eliminate or minimize wasteful heat exchange and which could be used with various types of fluids at varying pressure and temperatures.

SUMMARY OF THE INVENTION

The present invention satisfies the foregoing needs. Thus, an improved valve and assembly are provided which are substantially as set forth in the Abstract above and which automatically balance and regulate fluid flow in response to pressure variations but without causing wasteful fluid mixing or heat exchange. The valve and assembly are useful in systems employing hot and cold water lines, or other fluids at varying temperatures and pressures. Only the valve body itself moves and it contains no parts which are subject to wear. The valve housing in which the valve body is disposed has no easily corrodible parts, no springs, pins, etc. and is of the most simple, inexpensive, durable yet effective construction, as is the valve body.

The valve body is specially configured to selectively obstruct flow of a first fluid through the housing and is disposed in a special channel with exposure only at its ends to fluid pressures from the two fluid sources to be regulated. The valve body, with its reduced central portion, preferably oval in shape and containing interconnecting passageways, is designed to freely float without wear or binding, its changing shifting position being dictated by the relative fluid pressures on its opposite ends in its channel. Such a valve and assembly require no maintenance and can be made inexpensively of the sturdiest longest wearing materials for maximum utility. Further advantages are set forth in the following detailed description and accompanying drawings.

DRAWINGS

DETAILED DESCRIPTION

FIG. 1

Figure 1:
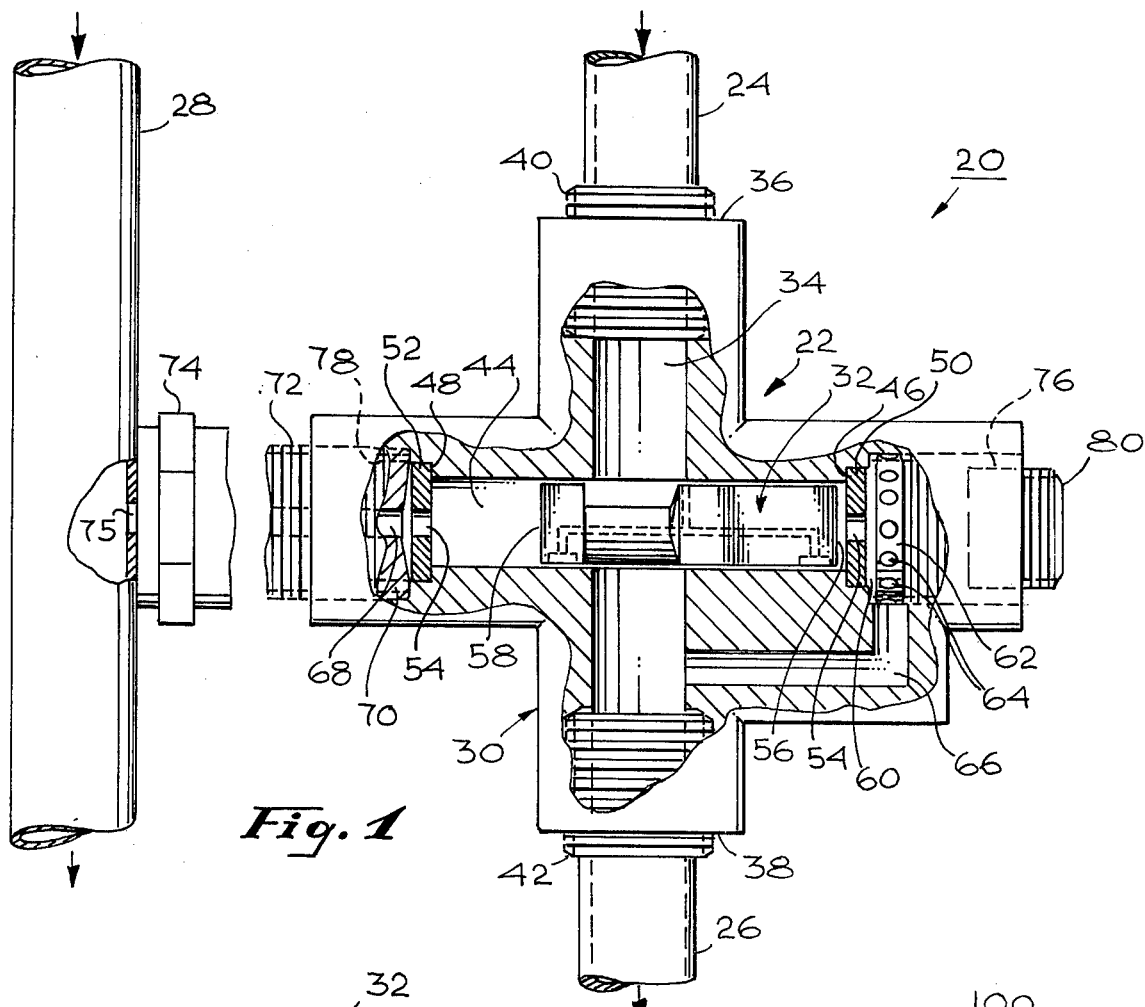
FIG. 1 is a schematic side elevation, partly broken away, of a first preferred embodiment of the improved valve and assembly of the invention.
Figure 2:
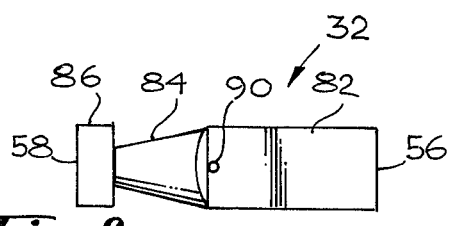
FIG. 2 is a schematic top plan view of the valve body of FIG. 1.
Figure 6:
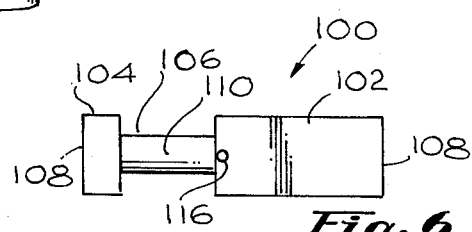
FIG. 6 is a schematic top plan view of a modified valve body for use in the present valve.
Figure 3:
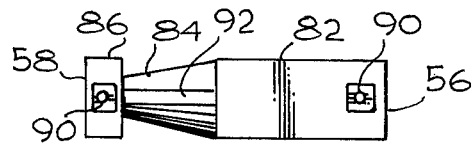
FIG. 3 is a schematic bottom plan view of the valve body of FIG. 1.
Figure 7:
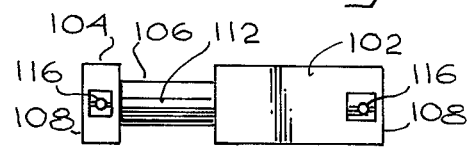
FIG. 7 is a schematic bottom plan view of the modified valve body of FIG. 6.
Figure 4:
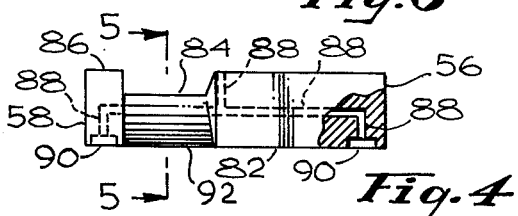
FIG. 4 is a schematic side elevation of the valve body of FIG. 1.
Figure 8:
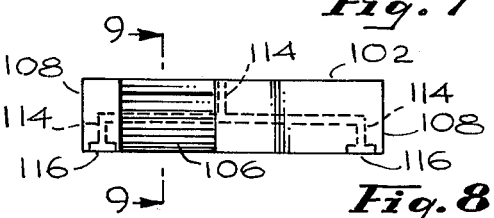
FIG. 8 is a schematic side elevation of the modified valve body of FIG. 6.
Figure 5:
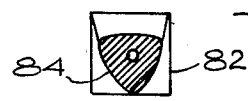
FIG. 5 is a schematic transverse cross-section, taken along the section line 5—5 of FIG. 4.

Now referring more particularly to FIG. 1 of the drawings, a preferred embodiment of the improved valve and assembly of the invention is schematically depicted therein. Thus, there is shown in side elevation an assembly 20 which comprises a valve 22 to which is directly connected a first fluid source, such as a cold water supply pipe 24 and cold water exit pipe 26, and to which is indirectly remotely connected a second fluid source such as a hot water pipe 28, exhibiting a pressure an/or temperature difference from that of the first source.

Valve 22 includes a valve housing 30 and a valve body 32 disposed in housing 30, as hereinafter described. Thus, housing 30 includes a first channel 34 in the form of a fluid-receiving channel which extends all the way therethrough, that is, from one side 36 to the opposite side 38 thereof. Channel 34 is threaded adjacent sides 36 and 38 and releasably threadably receives the threaded ends 40 and 42, of pipes 24 and 26, respectively, so as to permit fluid, such as cold water, to pass through housing 30 without leaking therefrom.

Channel 34 is intersected, preferably at about 90°, by a second channel 44, specifically a channel which contains valve body 32, as shown in FIG. 1. Channel 44 is longer than the width of channel 34 and thus extends on either side thereof. The opposite ends 46 and 48 of channel 44 are provided with generally flat valve body stop pieces 50 and 52, respectively, each bearing a central aperture 54 extending therethrough, as shown in FIG. 1, to provide fluid pressure communication with the ends 56 and 58 of valve body 32. Stop 50 faces channel 44 on one side thereof and a chamber 60 on the other side thereof, within which is disposed an apertured ring 62, the apertures 64 of which communicate with aperture 54 and a small pressure-transmitting passageway 66 extending between chamber 60 and channel 34 preferably on the downstream side thereof in housing 30, as shown in FIG. 1. Thus, fluid pressure from fluid such as cold water in pipes 24 and 26 and channel 34 is transmitted to end 56 of valve body 32 through passageway 66, chamber 60 ring 62, apertures 64 and 54 and end 46 of channel 44, so as to exert its influence thereon.

A second fluid pressure is transmitted to opposite end 48 of valve body 32 through end 48 of channel 44, aperture 54 in stop 52, a like aperture 68 in a connector end 70 disposed adjacent the outer face of stop 52 and disposed in a conduit 72 connected to remote hot water pipe 28, as by a fitting 74 having a small inner aperture 75 leading into pipe 28. Housing 30 may include the internally threaded extensions 76 and 78 which releasably threadably receive, respectively, a threaded plug 80 defining a portion of chamber 60, and a threaded portion of conduit 72, as shown in FIG. 1.

It will be noted that apertures 54, 68 and 75 are sufficiently large to assure transfer, without plugging, of the desired fluid pressure to end 58 of valve body 32 but are sufficiently small to avoid any material transfer of fluid from pipe 28 to channel 34 or vice versa. Accordingly, mixing of the fluids in pipe 28, on the one hand, and pipes 24 and 26 and channel 34 on the other hand is essentially completely avoided, as is heat exchange between those two fluids. This represents a substantial advance in the art.

FIGS. 2-5

The desired isolation of the first and second fluids is promoted by the configuration of valve body 32, as schematically depicted in FIGS. 2-5. Thus, valve body 32 includes a main body portion 82, a reduced portion 84 and a tail portion 86. Reduced portion 84 is smaller in at least one dimension, such as height, than and separates main portion 82 from tail 86. Valve body 32 and channel 44 are dimensioned so that valve body 32 is considerably shorter in length than channel 44 but, except for portion 84, otherwise largely fills channel 44 and impedes the free passage of fluid from pipe 28 therethrough. Sufficient clearance, however, remains for valve body 32 in channel 44 to permit it to freely float thereon and not bend thereagainst during its movements along the length thereof. To facilitate this flotation and movement, valve body 32 preferably is relatively light in weight and has a number of communicating passageways 88 exiting the surface thereof at spaced locations 90. Moreover, when viewed in transverse cross-section, as in FIG. 5, portion 84 preferably is generally oval or wedge-shaped with the largest transverse diameter thereof adjacent the upper end, the narrow lower end 92 thereof (FIG. 3) acting as a rudder to keep it in the proper upright orientation.

Portion 84 may also be designed so that the sides thereof tend to converge, gradually tapering from the wide portion near main body portion 82 to tail portion 86 (FIGS. 2 and 3) so that the fluid flow-obstructing effect of valve body 32 on channel 34 will vary, depending on what portion or portions of body 32 are in channel 34 at any given time.

Ends 56 and 58 of valve body 52 are relatively large and flat and thus receive the full force of the fluid pressures exerted thereupon from the first fluid source, such as pressure from cold water in pipes 24 and 26 and channel 34, i.e., a given pressure at low temperature, and pressure from hot water in pipe 28, i.e., a different pressure at a higher temperature. In a preferred embodiment, the ends 56 and 58 of valve body 52 have a larger diameter (and attendant surface area presentation to the fluid) than the diameter of channel 34. Valve 22 in assembly 20 operates as follows: when hot water is passed through pipe 28 and cold water through pipes 24 and 26, the hot water exerts a pressure on end 58 of valve body 32 via openings 75, 68 and 54, tending to drive valve body 32 towards end 50 in channel 44. The cold water exerts a counter pressure on end 56 of valve body 32, via conduit 66, openings 64 and 54, tending to drive valve body 32 towards end 52 in channel 44. The position of valve body 32 in channel 44 at any moment is dictated by the relative force of these two different pressures acting on opposite ends 56 and 58, and thus the extent of obstruction by main body portion 82 of valve body 32 to the rate of fluid flow in channel 34 is automatically regulated thereby.

In the event that line pressure increases in pipe 28 or decreases in pipes 24 and 34, as may normally from time to time occur to a minor extent in most water piping systems, valve body 32 will be forced towards stop 50 in channel 44, thereby automatically decreasing the extent of obstruction by main body portion 82 of valve body 32 to the flow of water through pipes 24, 34 and 26. This automatically increases the flow rate of cold water from pipe 36 to compensate for that from pipe 28. In the event of a decrease in pressure in pipe 28 or increase in pressure in pipes 24 and 34, valve body 32 will be forced towards stop 52, thereby automatically increasing the extent of obstruction by main body portion 82 to the flow of water through pipes 24, 34 and 26. This automatically decreases the flow rate of cold water from pipe 36 to match or compensate for that from pipe 28.

A simultaneous and equal increase (or decrease) in pressure in pipe 28, 24 and 34 will result in no appreciable movement of valve body 32. The hot water and cold water emitted downstream of assembly 20 may be kept separate, but is usually mixed together. Additional valves (not shown) can be employed upstream and/or downstream in pipes 24, 26 and 28, as desired. Such usually is the case in the event assembly 20 is installed in a cold water-hot water supply system for a shower stall or the like. Thus, minor fluctuations in line pressure in the hot water line and/or cold water line during their use are automatically and quickly compensated for by assembly 20.

FIGS. 6-9

Figure 9:
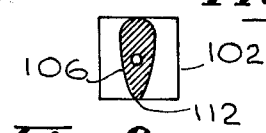
FIG. 9 is a schematic transverse cross-section taken along the section line 9—9 of FIG. 8.

A modified form of the valve body utilized in the improved valve and assembly of the invention is shown schematically in FIGS. 6-9. Thus, a valve body 100 is shown which includes a generally rectangular elongated main body portion 102, an abbreviated tail portion 104 and an intermediate portion 106 of reduced size connected to the same. Portions 102 and 104 have large flat outer faces 108 adapted to receive the full force of fluid pressure thereon. Portion 106 is narrower in width than portions 102 and 104, and lower in height and tapers generally from adjacent its upper end 110 to its lower end 112 so as to present an oval configuration in transverse cross section (FIG. 9). This configuration facilitates proper natural orientation of valve body 100 in a fluid stream such as that of channel 34, with the top of body 100 facing the upstream end of channel 34 and the bottom of body 100 facing the downstream end. Body 100 is also provided with a number of communicating passageways 114 exiting body 100 at spaced points 116 to facilitate its flotation. Accordingly, valve body 100 is ideally suited for use in channel 44 in place of valve body 32, if desired.

It will be understood that valve bodies 32 and 100, as well as housing 39 can be constructed of any suitable materials which are corrosion resistant, durable and preferably inexpensive. Moreover, their configuration and that of the fluid sources of assembly 20 can be modified, altered, changed or added to in various ways and still provide the desired results. All such changes, modifications, alterations and additions as are within the scope of the appended claims form part of the present invention.

What is claimed is:

1. An improved self-regulating fluid pressure and temperature valve, said valve comprising, in combination:

a. a valve housing having (1) a single fluid-receiving channel extending therethrough for direct connection with a first source of fluid flow, (2) a valve body-receiving channel intersecting said fluid-receiving channel in said housing and extending on opposite sides of said fluid-receiving channel, (3) a fluid-pressure passageway leading from said fluid-receiving channel into communication with one end of said valve body-receiving channel for transmittal of fluid pressure thereto, and (4) conduit means for interconnecting the opposite end of said valve body receiving channel with pressure from a remote second source of fluid flow, without permitting fluid from said second source of fluid flow to pass into and through said housing; and, b. a free-floating valve body disposed in said valve body-receiving channel and including a main body portion of dimensions sufficient to largely obstruct the flow of fluids through said fluid-receiving channel and a reduced portion having smaller dimensions than said main body portion so as to largely unobstruct the flow of fluid through said fluid-receiving channel, the relative fluid pressures exerted on said opposite ends of said valve body automatically determining the position of said valve body in said valve body-receiving channel and thus the rate of flow of fluid through said fluid-receiving channel, said valve body including intercommunicating passageways extending to the exterior thereof at spaced locations to facilitate a reduction in weight and free flotation of said valve body.

2. The improved self-regulating valve of claim 1 wherein said first and second sources of fluid flow differ in fluid pressure.

3. The improved self-regulating valve of claim 2 wherein said first and second sources of fluid flow are at different temperatures.

4. The improved self-regulating valve of claim 2 wherein said valve body-receiving channel has stops disposed therein.

5. The improved self-regulating valve of claim 2 wherein said two channels intersect at about right angles to each other.

6. The improved self-regulating valve of claim 5 wherein said fluid pressure passageway connects to the downstream side of said fluid-receiving channel.

7. The improved self-regulating valve of claim 2 wherein said reduced portion of said valve body is connected at its opposite ends to said main body and to a tail portion and wherein said tail portion has dimensions larger than said reduced portion.

8. The improved self-regulating valve of claim 7 wherein said reduced portion is tapered longitudinally.

9. An improved self-regulating fluid pressure and temperature valve assembly, said assembly comprising in combination:

a. a valve housing having (1) a single fluid-receiving channel extending therethrough for connection with a first source of fluid flow, (2) a valve in body-receiving channel intersecting said fluid-receiving channel in said housing and extending on opposite sides thereof, (3) a fluid-pressure passageway leading from said fluid-receiving channel to one end of said valve body-receiving channel for transmittal of fluid pressure thereto, and (4) means for interconnecting the opposite end of said valve body-receiving channel with pressure from a second source of fluid flow without permitting fluid from said second source to flow into and through said housing;

b. a free-floating valve body disposed in said valve body-receiving channel and including a main body portion of dimensions sufficient to largely obstruct flow of fluid through said fluid-receiving channel, and a reduced portion having smaller dimensions than said main body portion so as to largely unobstruct flow of fluid through said fluid-receiving channel said valve body including intercommunicating passageways extending to the exterior thereof at spaced locations to facilitate a reduction in weight and free floation of said valve body;

c. a first source of fluid flow connected to opposite ends of said fluid-receiving channel so as to pass fluid through said housing; and, d. a second source of fluid flow remotely connected to said means in a manner to transmit pressure to said opposite end of said valve body-receiving channel without introducing substantial amounts of fluid into and through said valve body-receiving channel, whereby the relative fluid pressures exerted from said two sources on said opposite ends of said valve body automatically regulate the rate of flow of first source fluid through said housing.

10. The improved assembly of claim 9 wherein said assembly is for use in balancing pressure and temperature differences in a water heating and supply system and wherein said first source of fluid flow is a cold water line directly connected to said housing and wherein said second source of fluid flow is a hot water line disposed remote to said housing and interconnected only thereto through said means in the form of a pressure transmitting line, said hot water line not passing near or into said housing, whereby heat exchange between said hot and cold water lines is avoided.

11. The improved assembly of claim 9 wherein said first and second sources of fluid flow differ in pressure.

12. The improved assembly of claim 11 wherein said sources comprise, respectively, first and second water lines and wherein said first water line is connected directly to said housing at said fluid-receiving channel.

13. The improved assembly of claim 11 wherein said sources of fluid flow are at different temperatures.

14. The improved assembly of claim 11 wherein said valve body-receiving channel has stops at opposite ends thereof.

15. The improved assembly of claim 11 wherein said two channels intersect at about right angles to each other.

16. The improved assembly of claim 15 wherein said fluid pressure passageway connects to the downstream side of said fluid-receiving channel.

17. The improved assembly of claim 11 wherein said reduced portion of said valve body is connected at its opposite ends to said main body and to a tail portion, and wherein said tail portion has dimensions larger than said reduced portion.

18. The improved assembly of claim 17 wherein said reduced portion is tapered longitudinally.

19. An improved self-regulating fluid pressure and temperature valve, said valve comprising, in combination:

a. a valve housing having (1) a single fluid-receiving channel extending therethrough for direct connection with a first source of fluid flow, (2) a valve body-receiving channel intersecting said fluid-receiving channel in said housing and extending on opposite sides of said fluid-receiving channel, (3) a fluid-pressure passageway leading from said fluid-receiving channel into communication with one end of said valve body-receiving channel for transmittal of fluid pressure thereto, and (4) conduit means for interconnecting the opposite end of said valve body-receiving channel with pressure from a remote second source of fluid flow, without permitting fluid from said second source of fluid flow to pass into and through said housing; and, b. a free-floating valve body disposed in said valve body-receiving channel and including a main body portion of dimensions sufficient to largely obstruct the flow of fluids through said fluid-receiving channel and a reduced portion oval in cross-section and having smaller dimensions than said main body portion so as to largely unobstruct the flow of fluid through said fluid-receiving channel, the greatest diameter of said reduced portion being adjacent its upper end, whereby flotation of said valve body is facilitated, the relative fluid pressures exerted on said opposite ends of said valve body automatically determining the position of said valve body in said valve body-receiving channel and thus the rate of flow of fluid through said fluid-receiving channel.

20. An improved self-regulating fluid pressure and temperature valve, said valve comprising, in combination:

a. a valve housing having (1) a single fluid-receiving channel extending therethrough for direct connection with a first source of fluid flow, (2) a valve body-receiving channel intersecting said fluid-receiving channel in said housing and extending on opposite sides of said fluid-receiving channel, (3) a fluid-pressure passageway leading from said fluid-receiving channel into communication with one end of said valve body-receiving channel for transmittal of fluid pressure thereto, and (4) conduit means for inter-connecting the opposite end of said valve body-receiving channel with pressure from a remote second source of fluid flow, without permitting fluid from said second source of fluid flow to pass into and through said housing, said first and second fluid pressure sources differing in pressure; and, b. a free-floating valve body disposed in said valve body-receiving channel and including a main body portion of dimensions sufficient to largely obstruct the flow of fluids through said fluid-receiving channel and a reduced portion having smaller dimensions than said main body portion so as to largely unobstruct the flow of fluid through said fluid-receiving channel, said reduced portion being connected at its opposite ends to said main body and to a tail portion having larger dimensions than said reduced portion, the relative fluid pressures exerted on said opposite ends of said valve body automatically determining the position of said valve body in said valve body-receiving channel and thus the rate of flow of fluid through said fluid-receiving channel, said valve body including interconnecting passageways to the exterior thereof at spaced locations to facilitate a reduction in weight and free flotation of said valve body.

21. An improved self-regulating fluid pressure and temperature valve, said valve comprising, in combination:

a. a valve housing having (1) a single fluid-receiving channel extending therethrough for direct connection with a first source of fluid flow, (2) a valve body-receiving channel intersecting said fluid-receiving channel in said housing and extending on opposite sides of said fluid-receiving channel, (3) a fluid-pressure passageway leading from said fluid-receiving channel into communication with one end of said valve body-receiving channel for transmittal of fluid pressure thereto, and (4) conduit means for interconnecting the opposite end of said valve body-receiving channel with pressure from a remote second source of fluid flow, without permitting fluid from said second source of fluid flow to pass into and through said housing said first and second fluid pressure sources differing in pressure; and, b. a free-floating valve body disposed in said valve body-receiving channel and including a main body portion of dimensions sufficient to largely obstruct the flow of fluids through said fluid-receiving channel and a reduced portion oval in cross section and having smaller dimensions than said main body portion so as to largely unobstruct the flow of fluid through said fluid-receiving channel, said reduced portion being connected at its opposite ends to said main body and to a tail portion having larger dimensions than said reduced portion, said reduced portion having its greatest diameter adjacent its upper end, whereby flotation of said valve body is facilitated, the relative fluid pressures exerted on said opposite ends of said valve body automatically determining the position of said valve body in said valve body-receiving channel and thus the rate of flow of fluid through said fluid-receiving channel.

22. An improved self-regulating fluid pressure and temperature valve assembly, said assembly comprising in combination:

a. a valve housing having (1) a single fluid-receiving channel extending therethrough for connection with a first source of fluid flow, (2) a valve in body-receiving channel intersecting said fluid-receiving channel in said housing and extending on opposite sides thereof, (3) a fluid-pressure passageway leading from said fluid-receiving channel to one end of said valve body-receiving channel for transmittal of fluid pressure thereto, and (4) means for interconnecting the opposite end of said valve body-receiving channel with pressure from a second source of fluid flow without permitting fluid from said second source to flow into and through said housing;

b. a free-floating valve body disposed in said valve body-receiving channel and including a main body portion of dimensions sufficient to largely obstruct flow of fluid through said fluid-receiving channel, and a reduced portion oval in cross-section and having smaller dimensions than said main body portion so as to largely unobstruct flow of fluid through said fluid-receiving channel, the greatest diameter of said reduced portion being adjacent its upper end, whereby flotation of said valve body in proper orientation is facilitated;

c. a first source of fluid flow connected to opposite ends of said fluid-receiving channel so as to pass fluid through said housing; and, d. a second source of fluid flow remotely connected to said means in a manner to transmit pressure to said opposite end of said valve body-receiving channel without introducing substantial amounts of fluid into and through said valve body-receiving channel, whereby the relative fluid pressures exerted from said two sources on said opposite ends of said valve body automatically regulate the rate of flow of first source fluid through said housing.

23. An improved self-regulating fluid pressure and temperature valve assembly, said assembly comprising in combination:
   a. a valve housing having (1) a single fluid-receiving channel extending therethrough for connection with a first source of fluid flow, (2) a valve in body-receiving channel intersecting said fluid-receiving channel in said housing and extending on opposite sides thereof, (3) a fluid-pressure passageway leading from said fluid-receiving channel to one end of said valve body-receiving channel for transmittal of fluid pressure thereto, and (4) means for interconnecting the opposite end of said valve body-receiving channel with pressure from a second source of fluid flow without permitting fluid from said second source to flow into and through said housing;
   b. a free-floating valve body disposed in said valve body-receiving channel and including a main body portion of dimensions sufficient to largely obstruct flow of fluid through said fluid-receiving channel, and a reduced portion having smaller dimensions than said main body portion so as to largely unobstruct flow of fluid through said fluid-receiving channel, said reduced portion being connected to said main body and to a tail portion of larger dimensions than said reduced portion, said valve body including intercommunicating passageways to the exterior thereof at spaced locations to facilitate a reduction in weight and free flotation of said valve body;
   c. a first source of fluid flow connected to opposite ends of said fluid-receiving channel so as to pass fluid through said housing; and,
   d. a second source of fluid flow differing in pressure from said first source and remotely connected to said means in a manner to transmit pressure to said opposite end of said valve body-receiving channel without introducing substantial amounts of fluid into and through said valve body-receiving channel, whereby the relative fluid pressures exerted from said two sources on said opposite ends of said valve body automatically regulate the rate of flow of first source fluid through said housing.

24. An improved self-regulating fluid pressure and temperature valve assembly, said assembly comprising in combination:
   a. a valve housing having (1) a single fluid-receiving channel extending therethrough for connection with a first source of fluid flow, (2) a valve in body-receiving channel intersecting said fluid-receiving channel in said housing and extending on opposite sides thereof, (3) a fluid-pressure passageway leading from said fluid-receiving channel to one end of said valve body-receiving channel for transmittal of fluid pressure thereto, and (4) means for interconnecting the opposite end of said valve body-receiving channel with pressure from a second source of fluid flow without permitting fluid from said second source to flow into and through said housing;
   b. a free-floating valve body disposed in said valve body-receiving channel and including a main body portion of dimensions sufficient to largely obstruct flow of fluid through said fluid-receiving channel, and a reduced portion oval in cross section and having smaller dimensions than said main body portion so as to largely unobstruct flow of fluid through said fluid-receiving channel, said reduced portion being connected to said main body and to a tail portion of larger dimensions than said reduced portion, said reduced portion having its greatest diameter adjacent its upper end, whereby flotation of said valve body is facilitated;
   c. a first source of fluid flow connected to opposite ends of said fluid-receiving channel so as to pass fluid through said housing; and,
   d. a second source of fluid flow differing in pressure from said first source and remotely connected to said means in a manner to transmit pressure to said opposite end of said valve body-receiving channel without introducing substantial amounts of fluid into and through said valve body-receiving channel, whereby the relative fluid pressures exerted from said two sources on said opposite ends of said valve body automatically regulate the rate of flow of first source fluid through said housing.

* * * * *